Figures 1, 6:
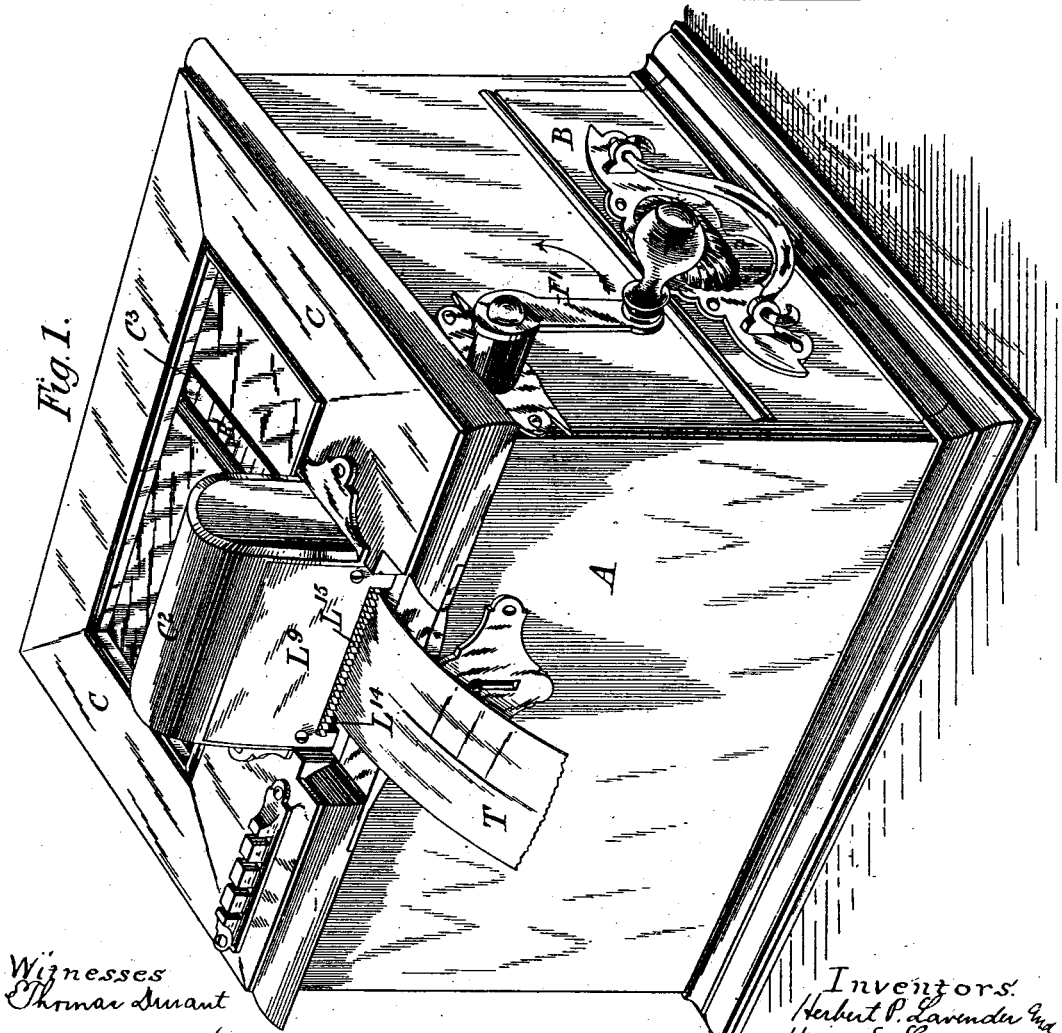

(No Model.) 6 Sheets—Sheet 1.
H. P. & H. E. LAVENDER.
CHECK TILL.
No. 548,562. Patented Oct. 22, 1895.

Witnesses
Thomas Durant
A. M. Kelly

Inventors:
Herbert P. Lavender and
Henry E. Lavender
by Clench & Clench
their attys

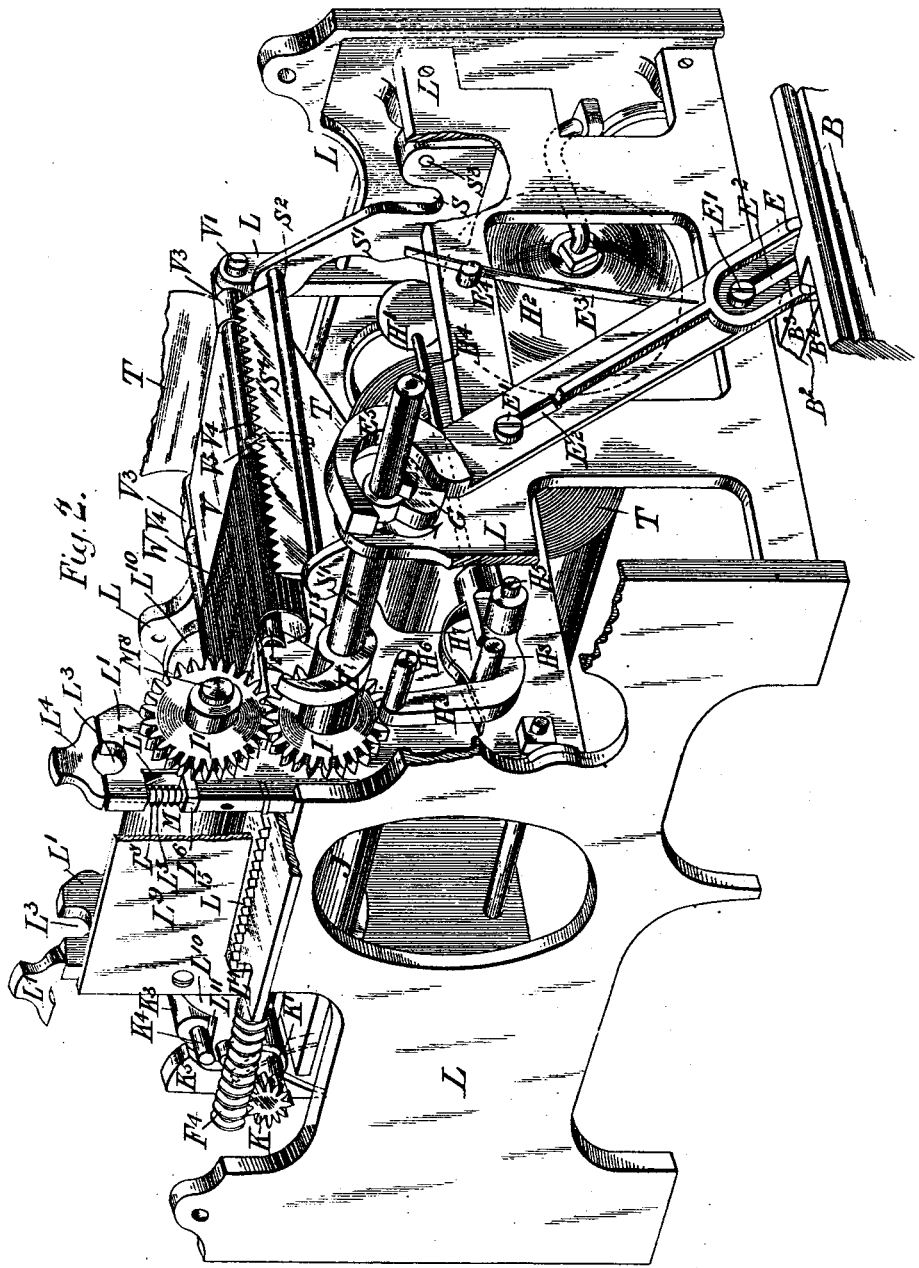

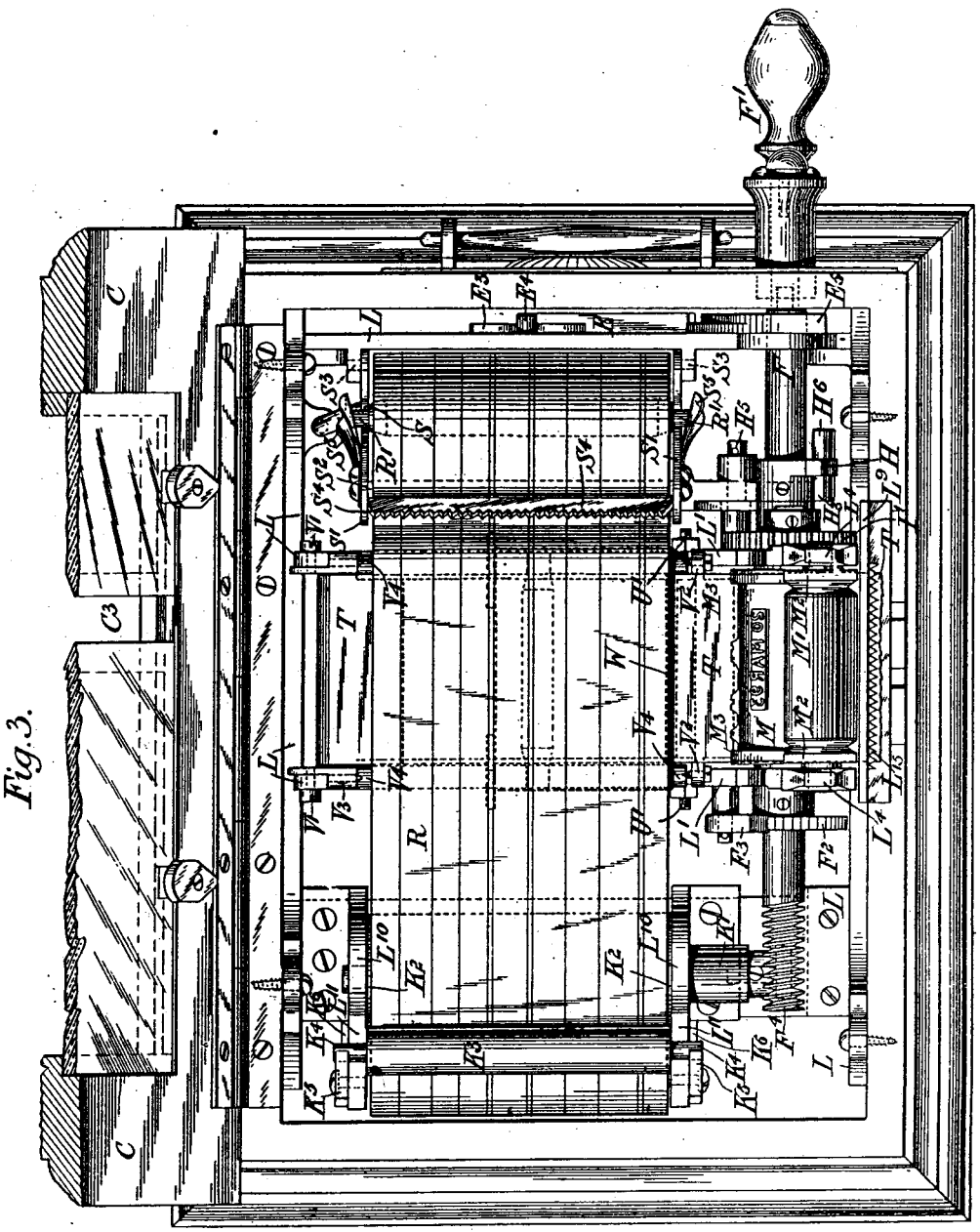

(No Model.) 6 Sheets—Sheet 4.
H. P. & H. E. LAVENDER.
CHECK TILL.
No. 548,562. Patented Oct. 22, 1895.
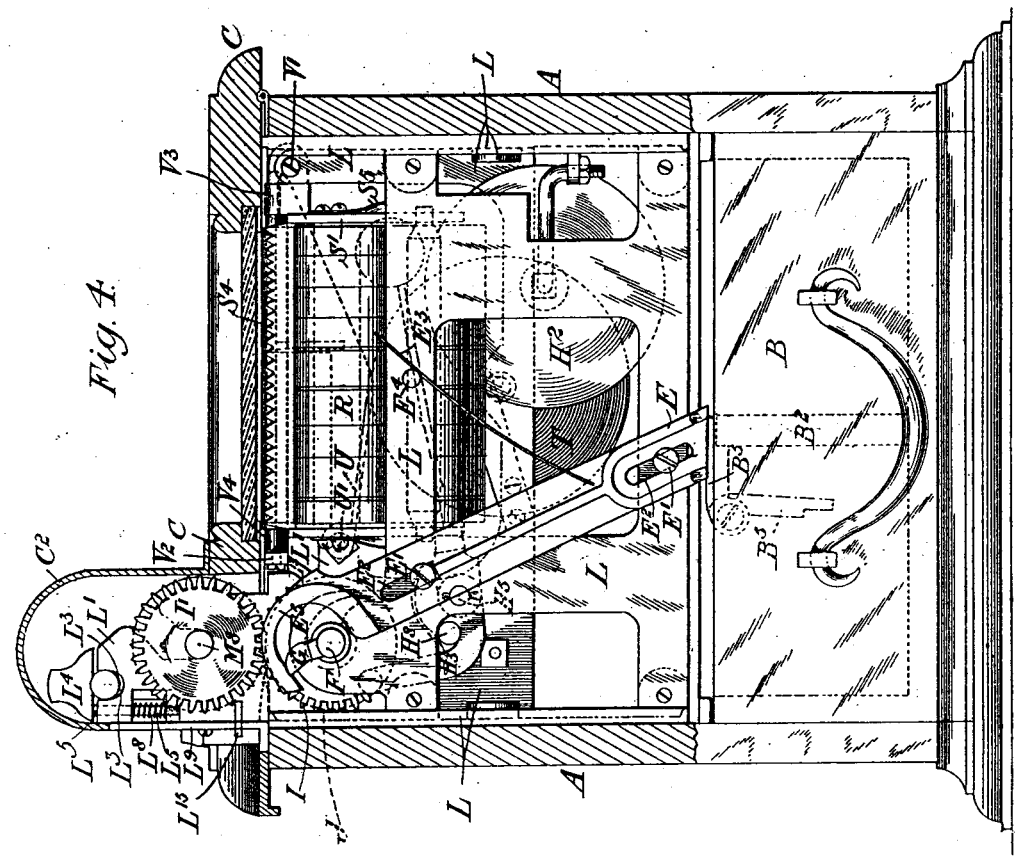
Witnesses
Thomas Durant
A. M. Kelly
Inventors.
Herbert P. Lavender and
Henry E. Lavender
by Church & Church
their attys.

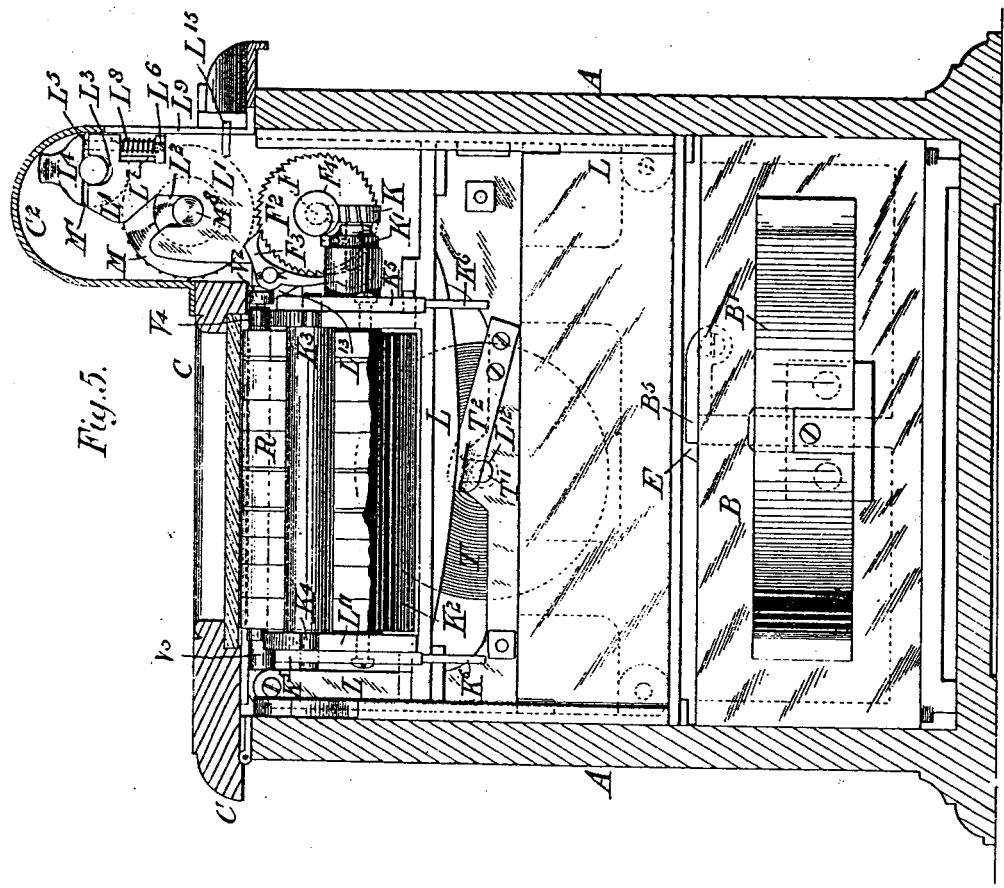

(No Model.)
H. P. & H. E. LAVENDER.
CHECK TILL.
No. 548,562. Patented Oct. 22, 1895.
6 Sheets—Sheet 6.
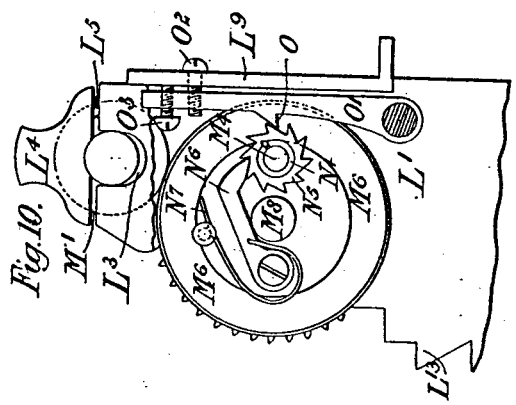
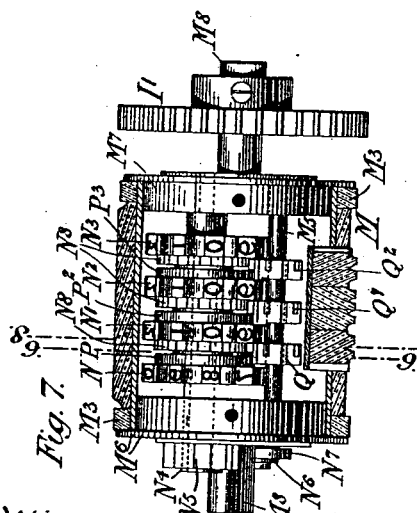
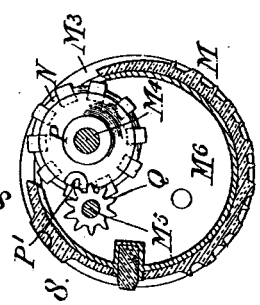
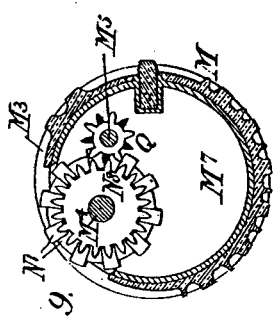
Witnesses
Thomas Durant
A. M. Kelly
Inventors
Herbert P. Lavender
Henry E. Lavender
by Church & Church
their Attys.

UNITED STATES PATENT OFFICE.

HERBERT PRICE LAVENDER, OF BIRMINGHAM, AND HENRY EDWARD LAVENDER, OF WALSALL, ENGLAND.

CHECK-TILL.

SPECIFICATION forming part of Letters Patent No. 548,562, dated October 22, 1895.

Application filed June 6, 1893. Serial No. 476,790. (No model.)

*To all whom it may concern:*

Be it known that we, HERBERT PRICE LAVENDER, residing at Birmingham, and HENRY EDWARD LAVENDER, residing at Walsall, England, subjects of the Queen of England, have invented certain new and useful Improvements in Check-Tills, of which the following is a specification.

This invention relates to check-tills and will be best understood by reference to the accompanying drawings, in which—

Figure 1 is a perspective view of the check-till complete. Fig. 2 is a perspective view of the mechanism removed from the case. Fig. 3 is a plan of the apparatus with the cover open, said cover being shown broken away. Figs. 4 and 5 are views showing the mechanism in end elevation and the case in transverse section, the drawer in Fig. 4 being shown in end elevation. Fig. 6 is a plan drawn to a scale smaller than that to which the other figures are drawn of the till-drawer removed from the casing. Figs. 7, 8, 9, 10, and 11 are views of a modified construction of the printing device for giving to each voucher or receipt delivered by the apparatus a distinctive number. Fig. 7 is an elevation partly in section; Fig. 8, a transverse section on the line 8 8 of Fig. 7; and Fig. 9 is a transverse section on the line 9 9 of Fig. 7. Fig. 10 shows the means from which the motion of the numbering device is derived. Fig. 11 is an edge view of one of the gear-wheels of the numbering device.

Like letters indicate like parts throughout the drawings.

A is the body of the case, which is fitted with a till-drawer B and hinged cover C in any convenient manner. The drawer B is adapted to move in and out of one of the ends of the till, and at its inner end is provided with a spring B', which, when the drawer B is pushed home within A, bears against the adjacent end wall of A, so that when the drawer is released the spring B' immediately forces it outward. The drawer is provided with a central partition $B^2$, the upper edge of which is preferably faced by a metal bar or equivalent $B^3$, Fig. 2, in one end of which is provided a recess $B^4$, with which engages the locking-bolt E, which is capable of being released from the recess $B^4$ in the manner hereinafter described.

The drawer B may be divided into the usual coin-receptacles, and may also be provided with a latch $B^5$, pivoted to it sinner end, the object of this latch being that when it occupies the position shown in Fig. 6 it will rest upon and project above the surface of $B^3$ and by engaging with one of the walls of the case A will prevent the drawer B being accidentally pulled or forced out of the till; but when it is desired to remove the till-drawer—as, for example, after the completion of the day's transactions—the latch $B^5$ may be turned from the position shown in Fig. 6 into the lower position in which it is represented in dotted lines in Fig. 4, so that the drawer may then be pulled entirely out of the case A.

The mechanism contained within the case A is operated by means of the shaft F, on whose end projecting outside the case A is secured a crank-handle F', Figs. 1 and 3. On the shaft F are rigidly secured the following devices, viz: a cam G for releasing the before-mentioned bolt E, another cam H for operating the hammer H' for striking a gong or bell $H^2$, a spur-wheel I for operating the printing device, a roller or drum J for moving one of the strips of paper, which strip being that from which the vouchers or receipts are received, is hereinafter for convenience termed the "voucher strip," a ratchet-wheel $F^2$, with which engages a pawl $F^3$, for preventing the shaft F from being rotated in the wrong direction, and, lastly, the shaft F is provided with a worm or screw-thread $F^4$, which engages with a worm-wheel K on the shaft K' of roller $K^2$, by which the second strip of paper is operated. This strip of paper, being that which receives the records of the transactions, is hereinafter for convenience referred to as the "record strip."

At one end—viz. that at which the handle is provided—the shaft F is supported in the framing L, which is preferably constructed of metal, and supports all the operative parts of the mechanism. The before-mentioned bolt E is held to the end of the framing L by means of two screws E', which pass through slots $E^2$ in the said bolt, which is thereby free to move in the direction of its length. The bolt E is fitted with a spring $E^3$ which bears against a pin or stud $E^4$ projecting from the frame L. This spring $E^3$ always tends to force the bolt E into its lowest position. At its upper end the bolt E is formed with a yoke or hooked portion $E^5$, within which the beforementioned cam G operates so as to raise the bolt E against the pressure of the spring $E^3$. In Fig. 2 the bolt E is shown in its lowest position, the upper ends of the slots $E^2$ at this time bearing upon the screws E' and the lower end of the bolt E engaging with the recess $B^4$ of the till-drawer. In Fig. 4 the bolt E is shown in its raised position when its lower end is released from the till-drawer recess $B^4$. The size of the yoke $E^5$ is preferably such that when the bolt E is in its raised position and held up by the drawer in the position shown in Fig. 4 the shaft can be rotated only until the cam G reaches the position shown in Fig. 2, as the said cam will then strike the lower side of the yoke or bolt; but when the yoke and bolt are in their lowered positions, as shown in said Fig. 2, the cam is free to rotate and raise the bolt, as before explained.

The bolt, it will be understood, is maintained in its elevated position during the time the the drawer is out by riding upon the rail $B^6$.

The audible signaling device operated by the before-mentioned cam H consists of the lever $H^3 H^4$, pivoted upon a fixed pin $H^5$, and carrying at one end the hammer H', adapted to strike the bell $H^2$. The lever-arm $H^3$ is provided with a pin $H^6$, which projects across the path of the cam H, and the arm $H^4$ is provided with a spring $H^7$, which bears upon a fixed pin $H^8$, the spring serving to throw the hammer down to the bell when the pin $H^6$ is released by the cam H, and the pin $H^8$ serving to stop the lever $H^3 H^4$ at such a position that by the yielding of its more flexible arm $H^4$ the hammer H' can reach the bell, the resilience of this arm serving to raise the hammer out of contact with the bell immediately after it has struck it.

The printing device consists, essentially, of the before-mentioned lower roller J, secured on the shaft F, the printing-roller M, which carries any suitable types or letters, preferably composed of india-rubber, and the inking-roller M'. These rollers J, M, and M' are mounted so as to rotate between two fixed plates L', which constitute a portion of the framing L.

On the shaft of roller M is rigidly secured a spur-wheel I', which gears with the before-mentioned wheel I, fixed on shaft F. The roller M is supported in open bearings $L^2$, as shown clearly in Figs. 4 and 5, and is pressed down with the required degree of pressure onto the paper on which it prints the vouchers by means of the inking-roller M', this last-mentioned roller for this purpose being provided with flanges or equivalent $M^2$, which bear upon, preferably, india-rubber rings $M^3$, provided at the ends of the roller M. The roller M' is mounted in bearings $L^3$, the covers $L^4$ of which are secured to pins $L^5$, which screw into nuts $L^6$, capable of sliding in a vertical direction in the plates L' within the recesses $L^7$ thereof. The nuts $L^6$ are operated on by springs $L^8$, which tend to press the nuts $L^6$ downward and consequently draw the covers $L^4$ more tightly down onto the shaft of the inking-roller, this roller being thereby pressed down onto the printing-roller, so as to ink the type-faces thereof, and also through the flanges $M^2$ and rings or collars $M^3$, to press the printing-roller M onto the paper passing between said printing-roller and the beforementioned lower roller J. The pressure which the caps $L^4$ exert upon the inking-roller shaft may be regulated by screwing the rods $L^5$ more or less into the nuts $L^6$, these caps $L^4$ being so arranged that when the till-cover C is open there is no obstacle to prevent the said covers or caps $L^4$ from being rotated for the purpose of adjusting their pressure on the shaft of the inking-roller. In Fig. 2 one of the covers $L^4$ is shown turned aside, the inking-roller M' is removed, and a portion of the plate L', which constitutes the front of the casing containing the printing device, is broken away.

The printing-roller may either be constructed in the manner represented in Fig. 3, wherein only one part is shown to be removable—viz., the date-printing type, this being mounted in the roller in any convenient manner—or it may be constructed in the manner shown, on an enlarged scale, in Figs. 7 to 10, wherein mechanism is so arranged that at each revolution of the printing-roller the numbering device contained in it is operated so as to imprint upon each voucher a distinctive number. The device represented in these figures consists of a drum bearing on a portion of its periphery india-rubber types for printing whatever matter may be necessary upon the vouchers, including the date, which may be changed from day to day, and two shafts $M^4 M^5$, on the former of which are mounted the type-carrying disks or wheels N N' $N^2 N^3$, in the present example four in number, but of which there may be more or less than this number, and the second of which shafts carries the gear-wheels for transmitting motion from one of these disks to the next of the series. The disk N carries the numbers indicating units and N' the numbers indicating tens, $N^2$ the numbers indicating hundreds and $N^3$ the numbers indicating thousands. The units-disk N is mounted rigidly on a sleeve $N^4$, supported or capable of rotating in a suitable bearing in the end plate or disk $M^6$ of roller M.

On the outer end of the sleeve $N^4$ is secured a ratchet-wheel $N^5$, which at every rotation of the roller M is caused to engage with a tooth O, forming part of an arm O', adjustably mounted on one of the plates L'. A pawl $N^6$, pivoted to the end plate $M^6$ of roller M and provided with a tail-spring $N^7$, engages with the ratchet-wheel $N^5$ and prevents it from turning in the wrong direction. At each rotation of the roller M the ratchet-wheel $N^5$ is brought into engagement with the tooth O and upon the further rotation of the roller M rotary motion is imparted to the ratchet-wheel $N^5$ and through it to the sleeve $N^4$ and units-disk N, so as to move said disk onward a tenth of a revolution to present a different number at its printing-surface.

The sleeve $N^4$ has also rigidly mounted upon it a disk P, having in its periphery a recess P', which is adapted to receive the sides of the wider or unmutilated teeth of carrying-wheels O. One of these wheels is shown in Fig. 11, from which it will be seen that every other tooth is cut away at one side. Thus wide and narrow teeth alternate, and when the parts are assembled the disks fit into the space left by cutting away the side of the narrow teeth, Figs. 8 and 9, one of the wider teeth then being in proximity to or resting against the periphery of the disk on each side and in position to enter the recess P' when the latter arrives at the position shown in Fig. 8. Now to insure the entry of the wide teeth into the recess the walls of the recess are extended out at the side of the disk, as shown in Figs. 8 and 11, forming in effect teeth $P^8$, which engage with the narrow teeth and insure the rotation of the carrying-wheel by causing the long teeth to enter the recess.

The unmutilated part of the wheel Q gears with the spur-wheel $N^8$, secured to the tens-disk N'. This tens-disk is provided with a disk $P^2$, having a recess P' and tooth $P^8$, which, like that of the disk P, engages with the mutilated part of a wheel Q', similar to that shown in Fig. 11, the unmutilated part of the wheel Q' gearing with the spur-wheel $N^8$ of the hundreds-disk $N^2$, which is provided with a disk $P^3$, having a recess P' and tooth $P^8$, which engages with the mutilated part of a wheel $Q^2$, the unmutilated part of which gears with the spur-wheel $N^8$, secured to the thousands-disk $N^3$. This arrangement may be carried on indefinitely to tens of thousands, hundreds of thousands, &c., by simply adding further disks and mutilated wheels, as before described. The disks N N' $N^2$ $N^3$ and their directly-connected parts are all supported and rotated upon the shaft $M^4$ and the mutilated wheels are supported and rotate upon the shaft $M^5$.

As before described, at each rotation of the roller M, Figs. 7 to 10, the ratchet-wheel $N^5$, sleeve $N^4$, and units-disk N are rotated a tenth of a revolution, and assuming that the number 9 has been presented at the printing side of the roller M at the last rotation of said roller, then when next the roller is rotated the recess P' and tooth $P^8$ of disk P will be presented to the mutilated wheel Q, so that when the ratchet-wheel $N^5$ engages with the tooth O the recess P' and tooth $P^8$ will cause the wheel Q to rotate. While the disk P is traveling through the distance necessary to expose its figures "1" to "9" at the printing side of the roller M no motion is transmitted to the tens-disk; but when it is moved from the "9" to "10" position the mutilated wheel Q is operated, and consequently the tens-disk N' is moved one-tenth of a revolution. This operation is repeated at every complete rotation of the units-disk, and correspondingly the hundreds-disk $N^2$ will be moved one-tenth of a revolution at every complete revolution of the tens-disk N', and so on, so that at each revolution of the roller M a number, one in advance of that presented at the previous rotation, will be printed on the voucher delivered when the apparatus is operated for recording a transaction.

Each of the disks $M^6$ $M^7$, constituting the two ends of the drum M, Figs. 7 to 10, has secured to or formed in part with it an outwardly-extending trunnion or short shaft $M^8$, which trunnions are supported in the before-mentioned open bearings $L^2$ and on one of which is secured the spur-wheel I'.

The position of the arm O' may be adjusted by means of screws $O^2$ $O^3$, the former of which has its head at the front or outside of the plate $L^9$ and its stem passing freely through $L^9$ and engaging with a screw-threaded opening in the arm O', and the latter is screwed into O' and at its end bears against the back of the plate $L^9$, or this arrangement, if desired, may be substantially reversed, the screw $O^2$ screwing through $L^9$ and against O' and the screw $O^3$ passing freely through O' and screwing into $L^9$.

The before-mentioned shaft K' is supported in bracket-bearings $L^{10}$, mounted rigidly on the main framing L, and on this shaft is rigidly secured the before-mentioned roller $K^2$, whose periphery is roughened or preferably covered with india-rubber or its equivalent, so as to enable it to properly "grip" the record-strip R.

$K^3$ is a roller, the shaft or journaled ends $K^4$ of which are supported on rails or plates $L^{11}$, preferably formed in part with the bracket-bearings $L^{10}$, and $K^5$ are arms or hooks pivoted to $L^{10}$ or $L^{11}$ and acted on by springs $K^6$ in such manner as to press their upper ends firmly against the shaft $K^4$ and thereby press the roller $K^3$ toward roller $K^2$, thus insuring the "gripping" of the record-strip R between $K^3$ and $K^2$. The shape of the hooks $K^5$ and the resilience of the springs $K^6$ are such as to admit of the roller $K^3$ being readily removed from and replaced in its operative position.

The roll of record-strip, as shown most clearly in Fig. 3, is supported by means of a shaft or mandrel R' passed through its center and the ends of which are adapted to rotate in open bearings S, formed in a frame S' $S^2$, pivoted at $S^3$, Figs. 2 and 3, to inwardly-projecting lugs of the frame L. At its free end the frame S' $S^2$ is provided with a serrated bar $S^4$ for facilitating the tearing off of portions of the record-strip R when the case is opened and it is desired to remove a portion of said strip. The bar S² of frame S' S², in conjunction with the serrated bar S⁴, serves to provide sufficient friction to prevent the record-strip from becoming slack. The shaft R' is prevented from accidentally leaving its bearings S by means of springs S⁵, secured to S', whose operative ends are rounded, so that when desired the shaft R' may readily be removed from or replaced in its working position by applying pressure to raise or lower it, the free ends of the springs S⁵ moving outward during such operation.

The shaft or mandrel T', on which the roll of voucher-strip T is mounted, is supported in open bearings L¹², from which it is prevented from being accidentally removed by springs T², (one of which is shown in Fig. 5,) similar to those S⁵ applied to the shaft S.

A plate U (shown in dotted lines in Fig. 4) is pivoted at U' to the plates L' and is adapted to rest at its free end on the roll T, so as to prevent the voucher-strip from unwinding too freely. This plate U may, when necessary, be turned into a vertical position to facilitate the insertion of a fresh roll T into the apparatus.

V is a table or frame pivoted at V' to the frame L and normally supported in a horizontal position by the lugs V² thereof resting on shoulders L¹³ of the plates L', as shown in Figs. 2, 4, and 5. Between each lug V² and a corresponding lug V³, near the pivoted end of V, is a roller V⁴, mounted preferably on or between centers, as shown, so as to rotate freely. These rollers V⁴ are provided for the purpose of insuring the movement of the transfer material W, which is supplied to the apparatus in the form of an endless band and is slipped over the free end of the table V.

W may be either carbon paper, cloth, silk, or other material, and is prevented from moving laterally by the supports for the edge of the table, on one side and guides or wings V⁵, secured to the under side of the table V, and extending each partly around one of the rollers V⁴, as shown in Fig. 2, on the other side. W is hereinafter for convenience referred to as the "transfer-band" or transfer material.

The voucher-strip T passes from the roll under the plate U round the pivoted end of the table V, then over the table, through the transfer-band W, between the rollers J and M, and thence to the outside of the apparatus through the opening L¹⁴ in plate L³, this opening being provided with a serrated plate L¹⁵ to facilitate the tearing off of the vouchers.

The record-strip R passes from its roll over the bar S² under the serrated bar S⁴, thence over the transfer-band W and between the rollers K² and K³, by which it is moved toward the lower part of the apparatus.

The before-mentioned plate L³, secured to the plates L', closes in a portion of the front of the printing device, which otherwise is inclosed by the hood C², secured to the lid C. The panel of the lid C is preferably formed of glass and has an opening C³, through which the records of transactions are written directly on the record strip R and indirectly through the medium of the transfer-band W on the voucher-strip T.

The record-strip R may be ruled to form money-columns and the printing-roller M may also print money-columns, the mechanism for operating the two strips being so arranged that the figures written in the various money-columns on the record-strip R will occupy similar positions in the respective money-columns afterward printed on the voucher or voucher-strip.

The operation of the before-described apparatus is as follows: When a transaction is to be recorded, the attendant writes on the portion of the record-strip R exposed at the slot C³, Figs. 1 and 3, the amount taken, which operation, as before described, through the transfer-band W, also effects a similar marking on the voucher-strip T. The handle F' is then rotated once in the direction indicated by the arrow in Fig. 1, at the end of which it is stopped by the cam G abutting against the bolt E, which, by the said cam G and yoke E⁵ is raised so that its lower end, becoming disengaged from the drawer-locking recess B⁴, allows the drawer to be forced outward by its spring B'. The money may then be placed in the drawer B, and if necessary change taken therefrom. Simultaneously with this operation the following operations also take place: First, the cam H engages with the pin H⁶ of lever H³ H⁴ and releases it to admit of the hammer H' striking the bell or gong H²; second, the rollers J and M are rotated and draw the voucher-strip T from off the roll and deliver a voucher-length through the opening L¹⁴ and at the same time print the necessary matter upon the voucher; third, through the worm-gearing F⁴ K the roller K² is rotated and the record-strip R is thereby moved onward, so that the record last made through the slot C³ is moved away from the slot to an inaccessible part of the apparatus, but like others of the recent records, may be seen through the glass panel of the cover C; fourth, by the friction of the record-strip R on the transfer-band W, and the fact of the band W being mounted on loosely-running rollers V⁴, said band also travels onward, so as to present a different part of the band for the marking of the next transaction on the voucher-strip T. After this cycle of operations, performed by one rotation of the handle F, the attendant may tear off the voucher projecting outside of the plate L³ against the serrated plate or bar L¹⁵ and hand it to the customer and again push the drawer into its closed position, wherein it will be retained until the apparatus is again operated by the bolt E, which is pressed down into the notch or recess B⁴ as soon as said notch is below E.

At the end of the day the case may be opened and the portion of the record-strip R, on which are recorded the day's takings, may be removed by tearing said strip R across the serrated bar S⁴, and may be filed away for subsequent reference or to check the takings.

We claim—

1. In a check till, the combination with the casing, and the drawer sliding therein and having the locking shoulder or notch, of the locking bolt cooperating with said notch when the drawer is closed and held in elevated position when the drawer is opened, an operating shaft, a cam moved thereby and intersecting the path of the locking bolt when the latter is raised, whereby the shaft is held against rotation and a yoke on said bolt, with which the cam cooperates to raise the bolt; substantially as described.

2. In a check till, the combination with the casing and till drawer sliding therein and having the locking recess at the front end, of the locking bolt having the yoke at the upper end, the operating shaft passing through said yoke and the cam on said shaft cooperating with the yoke to raise the bolt, the end of the bolt when so raised forming a stop for arresting the rotation of the shaft; substantially as described.

3. In a check till, the combination with the sliding drawer having the rail with the locking notch at the forward end, of a bolt cooperating with said notch to lock the drawer and riding on said rail when the drawer is opened whereby it is maintained in raised position, an operating yoke for the bolt, an operating shaft and a cam moved by said shaft in a path intersecting the bolt when raised and cooperating with the yoke to raise the bolt; substantially as described.

4. In a check till, the combination with the casing, the operating shaft, a pawl and ratchet wheel for preventing retrograde movement of said shaft, a cam on the shaft and a locking bolt moved by the cam into position to arrest the rotation of the shaft at a predetermined point, of the drawer cooperating with said bolt when opened to hold the same out in position to arrest the movement of the shaft; substantially as described.

5. In a check till, the combination with the operating shaft, a pawl and ratchet wheel for preventing retrograde movement of the shaft, a locking bolt, and a cam on the shaft cooperating with said bolt to move the same into position to arrest the shaft at a predetermined point, of a drawer having a locking notch with which said bolt cooperates to hold the drawer closed and a rail with which the bolt cooperates when the drawer is opened and whereby the bolt is held in position to arrest the operating shaft; substantially as described.

6. In a check till the combination with the supply and winding rolls for a record strip, and a supply and feeding rolls for a check strip journaled at right angles to the said record strip rolls, of a manifold ribbon and a passage way for the check strip beneath said manifold ribbon with means for guiding the record strip over the manifold ribbon, whereby both records may be seen and the original kept for the permanent record; substantially as described.

7. In a check till, the combination with the table having the rollers at the edges of the same and the endless manifold ribbon passing around the table of the voucher supply and feeding rolls arranged at right angles to the axis of the rolls on the table and supply and winding rolls for the record strip arranged with their axes substantially parallel with the axes of the rolls on said table whereby the manifold ribbon may be driven by frictional contact with the record strip; substantially as described.

8. In a check till, the combination with the voucher strip feeding roll and voucher supply roll of a movable table mounted between the two, an endless manifold ribbon passing around said table and guides for said ribbon, of a record supply and record winding roll arranged at right angles to the voucher feeding roll and a common drive shaft for said voucher feeding and record winding rolls; substantially as described.

9. In a check till, the combination with the voucher strip feeding and supply roller, a hinged table lying between the two, an endless manifold ribbon passing around the table with guides for preserving the alignment of the ribbon, of record supply and winding rolls journaled at right angles to the voucher supply and feeding rollers, an operating shaft, gearing connecting the voucher feeding and record strip winding rollers and operating shaft, and a movable stop for arresting the rotation of the operating shaft at a predetermined point; substantially as described.

10. In a check till, the combination with the operating shaft and winding rollers, of a pivoted frame having bearings for the supply roller and a tension bar at the end of said frame for cooperating with the strip, whereby the weight of the supply roller and frame maintains the tension on the strip; substantially as described.

11. In a check till, the combination with the operating shaft and winding rollers of the frame having the tension bar at one end and pivotally supported at the opposite end and a supply roller journaled in said frame at a point intermediate the pivots and tension bar; substantially as described.

In testimony whereof we have hereto set our hands in the presence of the two subscribing witnesses.

HERBERT PRICE LAVENDER.
HENRY EDWARD LAVENDER.

Witnesses:
ERNEST HARKER,
J. J. WOODGATE.